US009167155B2

(12) United States Patent
Wojciech

(10) Patent No.: US 9,167,155 B2
(45) Date of Patent: Oct. 20, 2015

(54) METHOD AND SYSTEM OF SPACIAL VISUALISATION OF OBJECTS AND A PLATFORM CONTROL SYSTEM INCLUDED IN THE SYSTEM, IN PARTICULAR FOR A VIRTUAL FITTING ROOM

(71) Applicant: Fashion3D Sp. z o.o., Warsaw (PL)

(72) Inventor: Klimek Jacek Wojciech, Toruń (PL)

(73) Assignee: Fashion3D Sp. z o.o., Warsaw (PL)

( * ) Notice: Subject to any disclaimer, the term of this patent is extended or adjusted under 35 U.S.C. 154(b) by 351 days.

(21) Appl. No.: 13/750,120

(22) Filed: Jan. 25, 2013

(65) Prior Publication Data

US 2013/0258045 A1    Oct. 3, 2013

(30) Foreign Application Priority Data

Apr. 2, 2012    (PL) .......................................... 398681

(51) Int. Cl.
*H04N 5/232* (2006.01)
*H02P 8/06* (2006.01)
(Continued)

(52) U.S. Cl.
CPC .......... *H04N 5/23238* (2013.01); *G06T 7/0024* (2013.01); *H02P 8/00* (2013.01); *H04N 5/23254* (2013.01); *H04N 5/23258* (2013.01); *H04N 5/23267* (2013.01)

(58) Field of Classification Search
CPC ........... H04N 5/23238; H04N 5/23254; G06T 7/0024
USPC ............ 348/36, 37, 61, 88, 68; 700/117, 118, 700/132, 153; 345/630, 621, 629
See application file for complete search history.

(56) References Cited

U.S. PATENT DOCUMENTS 6,330,523 B1    12/2001    Kacyra et al.
6,546,309 B1 *    4/2003    Gazzuolo ...................... 700/132
(Continued)

FOREIGN PATENT DOCUMENTS

EP          1959394         8/2008
WO         WO0135342       5/2001
(Continued)

OTHER PUBLICATIONS

Search Report from the Polish Patent Office dated Jul. 3, 2012, for Polish Application No. P-398681, Applicant, Fashion3D Sp. z o.o., Filed Apr. 2, 2012 and English translation (3 pages).
(Continued)

*Primary Examiner* — Jefferey Harold
*Assistant Examiner* — Jean W Desir
(74) *Attorney, Agent, or Firm* — McCracken & Gillen LLC

(57) ABSTRACT

The disclosure relates to a method and a system for virtual visualization of objects and a platform control system included in the system, in particular for a virtual fitting room. Users can combine garments and accessories and watch the presented objects in a virtual environment in different perspectives. The system includes a rotatable platform with a control system thereof, wherein on the platform there is situated a spatial pattern. The rotatable platform is connected to an image or video capture device, which in turn is connected to a processing device. The processing device includes a processing module. The processing module comprises an input module, which cooperates with a comparator module. The comparator module cooperates with or without a coherence module, which in turn cooperates with a combination creating module for matching objects on the spatial pattern through a segmentation module.

6 Claims, 5 Drawing Sheets

(51) Int. Cl.
*H02P 8/00* (2006.01)
*G06T 7/00* (2006.01)

(56) References Cited

U.S. PATENT DOCUMENTS

| | | | |
|---|---|---|---|
| 6,882,897 | B1 | 4/2005 | Fernandez |
| 7,039,486 | B2 * | 5/2006 | Wang .......................... 700/117 |
| 2002/0050988 | A1 | 5/2002 | Petrov et al. |
| 2005/0154487 | A1 | 7/2005 | Wang |
| 2010/0302275 | A1 | 12/2010 | Saldanha et al. |
| 2011/0142335 | A1 | 6/2011 | Ghanem et al. |

FOREIGN PATENT DOCUMENTS

| | | |
|---|---|---|
| WO | WO02057964 | 7/2002 |
| WO | 2011019965 | 2/2011 |
| WO | 2011033258 | 3/2011 |

OTHER PUBLICATIONS

European Patent Office International Search Report and Written Opinion dated Dec. 13, 2013, International Application No. EP12199461.0 (12 pages).

European Patent Office International Partial Search Report dated Oct. 31, 2013, International Application No. EP12199461.0 (6 pages).

* cited by examiner

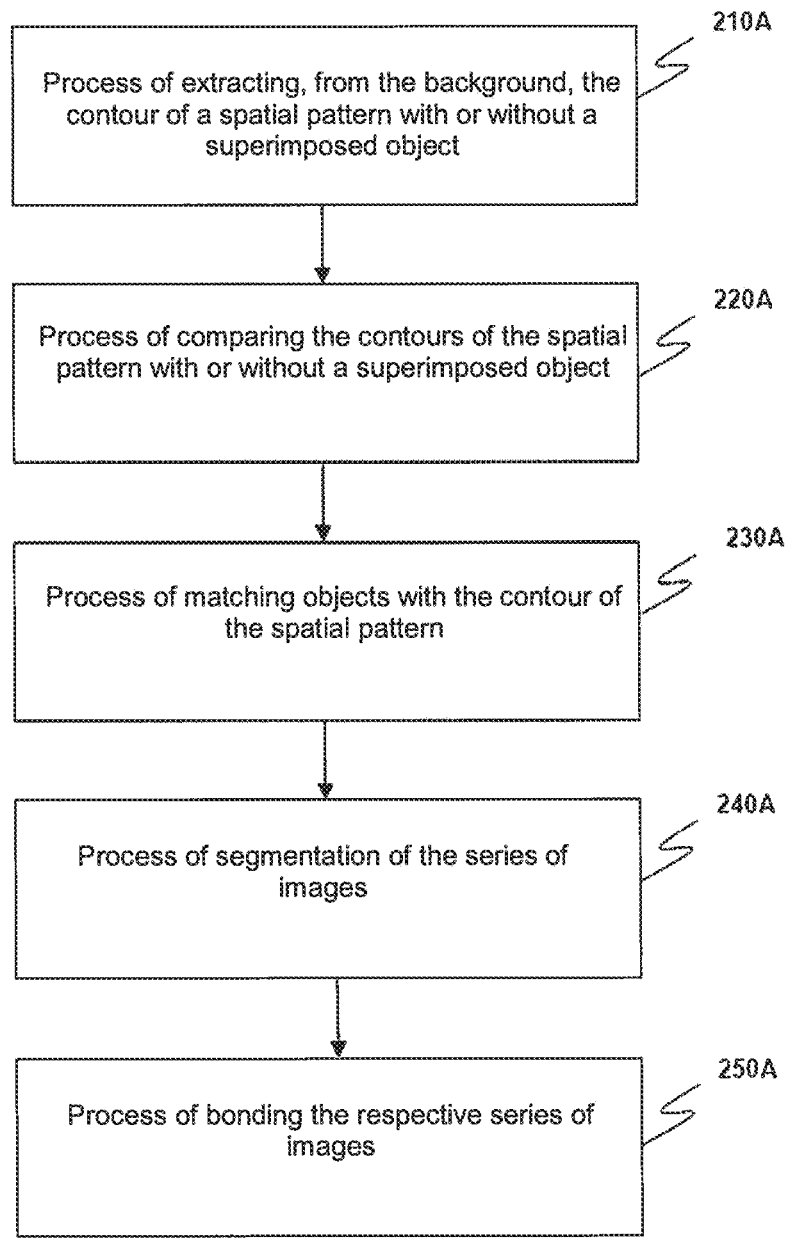

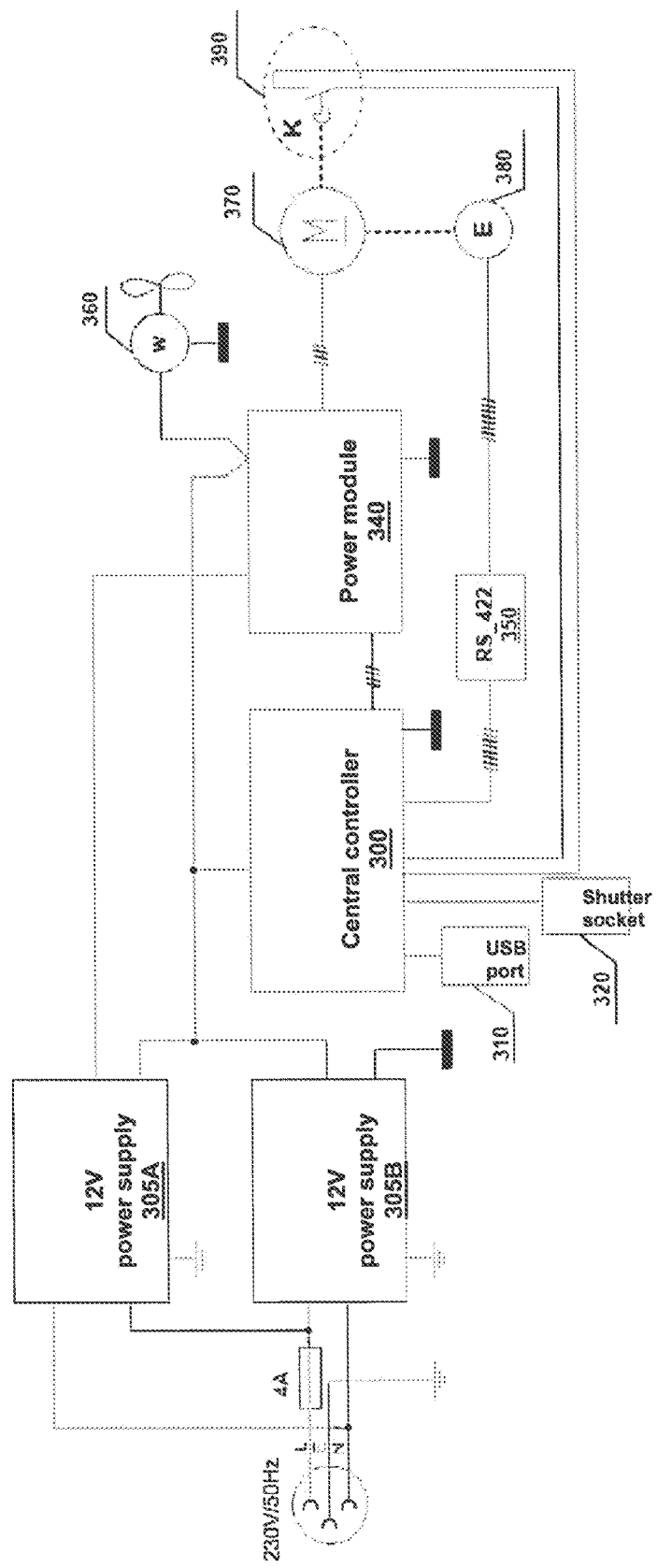

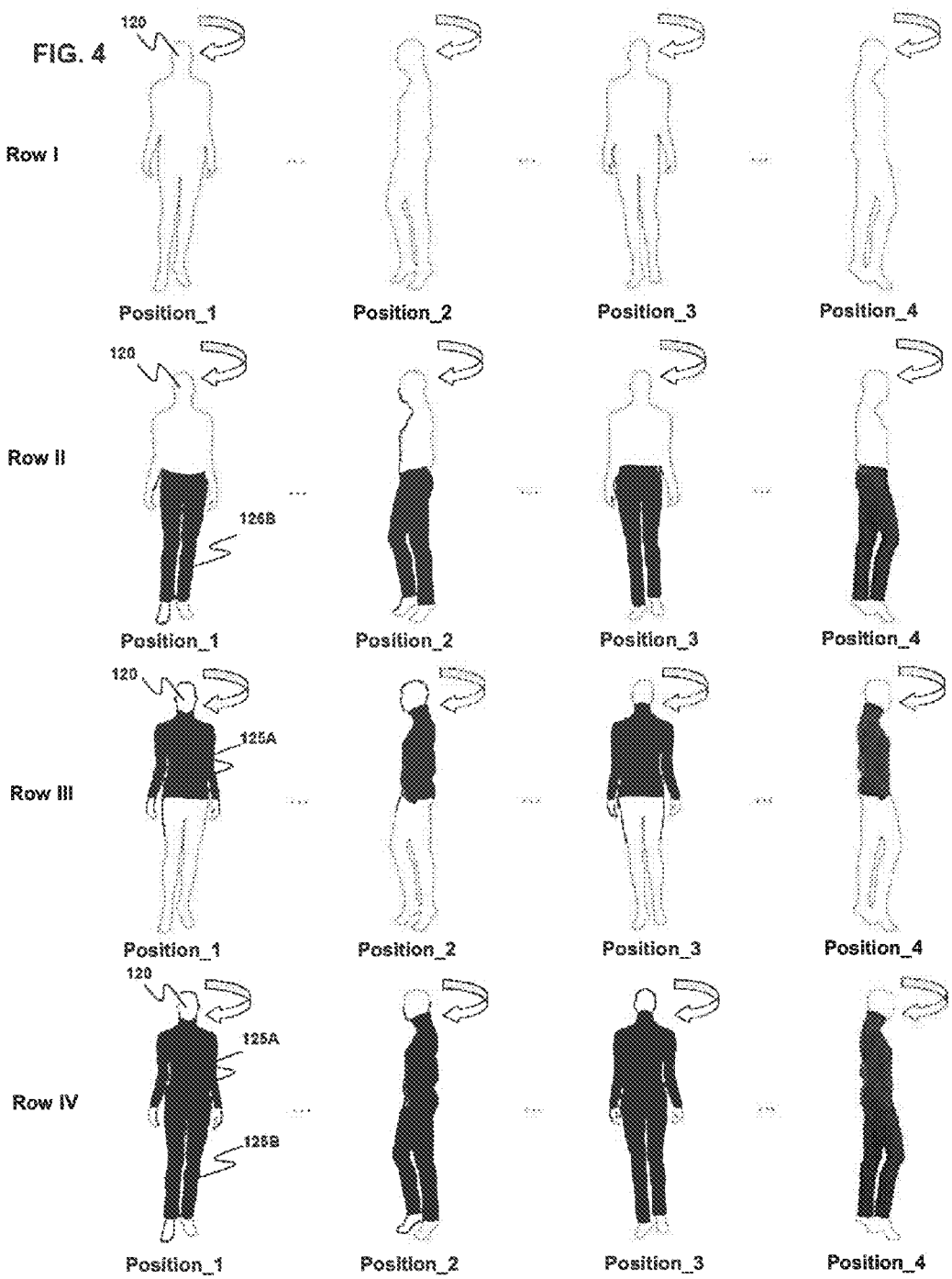

METHOD AND SYSTEM OF SPACIAL VISUALISATION OF OBJECTS AND A PLATFORM CONTROL SYSTEM INCLUDED IN THE SYSTEM, IN PARTICULAR FOR A VIRTUAL FITTING ROOM

CROSS-REFERENCE TO RELATED APPLICATIONS

The present application claims the benefit of Polish Application P-398681, filed Apr. 2, 2012, which is incorporated herein by reference in its entirety.

DESCRIPTION

1. Field of the Invention

The present invention relates to a method and system of spatial visualization of objects and a platform control system included in the system, in particular for a virtual fitting room, especially for combination garments and accessories, enabling users to watch presented objects in a virtual environment in different perspectives.

2. Description of the Prior Art

There are solutions known from the prior art which enable the user to create, by means of internet applications, combinations of garments and accessories in a flat image (e.g. photo) of a real life model or on an abstract human figure. Photos of garments and accessories are superimposed on a photo of a model or a contour of a human figure. Combinations obtained in this way, irrespective of the fact that they are frequently characterized by a high-quality rendering of the texture of materials and details, are flat and present one (sometimes two) images of a specific combination on a model.

Another solution known from the prior art relates to creating, by means of special computer programs, 3D models of a human figure and 3D models of garments and clothing accessories, and subsequently creating combinations from them. Models obtained in this way can be watched in different perspectives and distances, but the quality of such artificially created textures rendering the appearance of skin, fabrics and other materials is very poor. The resultant models of human figure are highly inaccurate and artificial. Considering that models obtained in this way contain full information concerning the spatial geometry of the created combination, it is very difficult to use them in internet applications, because data files describing models are considerably large and difficult to be transmitted to a user's computer. Watching the obtained combination in different perspectives and focuses requires installing, by the user, a special software, which is not a typical component of web browsers. In many new devices (tablets, smartphones) installing the necessary software is difficult or even impossible at all.

International patent application No. WO2011033258A1 entitled: "System and method for image processing and generating a body model" discloses a system and method for image processing, for example, obtaining alpha mattes of foreground objects, such as garments. The above-mentioned solution also relates to a method for adjustment of an image to an image of a body model and relates to a method of generating a body model. Generally, this involves generating foreground transparency masks.

Another international application No. WO2011019965A1 discloses a method and system of providing a simulation of wearing items such as garments and/or accessories. The disclosed solution allows the user to simulate wearing real-wearable items by providing a composite video feed that incorporates a video feed of the user and the selected at least one virtual-wearable item in such a way that the user appears to be wearing the selected at least one virtual-wearable item.

SUMMARY OF THE INVENTION

The purpose of the present invention is to provide a new solution which enables creating as accurate as possible a spatial visualization of real-life objects presented in virtual environment. The invention aims at providing users with a suitable environment for the best visualization in the form of a 360° presentation, in the simplest possible way, in order to obtain a spatial effect presenting real-life objects.

The nature of the solution consists in achieving high repeatability of series of images of the spatial pattern for various objects to be placed on the spatial pattern.

Considering the above, there is a need for developing a method and system of spatial visualization of presented objects, in particular for a virtual fitting room service, allowing potential customers to combine garments and accessories and thus watch them in a virtual environment.

The solution according to the present invention provides a method of spatial visualization of objects, in particular for a virtual fitting room wherein series of images of the objects are taken against a neutral background by means of an image or video capture device, comprising the steps of: taking a first series of images of a spatial pattern at a predetermined number of positions, the number of predetermined positions being determined on the basis of a rotational movement of the spatial pattern situated on a rotatable platform around an axis of the rotatable platform by a predetermined angle $\alpha$; subsequently taking a next series of images of the spatial pattern with at least one object superimposed onto the spatial pattern, the next series of images being taken at a predetermined number of positions identical to the predetermined number of positions associated with the first series of images; sending the first and the next series of images to a processing device; and processing the first and next series of images in the processing device using a processing module in order to process the first and next series of images to a full 360 degree view thereby enabling the combination of at least one object in different variants in the full 360 degree view on the spatial pattern.

Preferably, the first and next series of images is taken in the form of a series of photographs, and wherein each photograph in the series of photographs is taken after each rotation of the spatial pattern around the axis of the rotatable platform by a predetermined angle $\alpha$ of 15 degrees.

Preferably, further comprising the steps of: extracting from the neutral background a contour of the spatial pattern with or without at least one object superimposed onto the spatial pattern using an input module of the processing module, wherein the input module is coupled with a comparator module; comparing the contour of the spatial pattern with or without at least one object superimposed onto the spatial pattern using the comparator module; segmenting each of the series of images using a segmentation module; and bonding the images using a combination creating module in order to obtain the full 360 degree view.

Preferably, further comprising the step of matching objects with the contour of the spatial pattern using a coherence module.

The solution according to the invention also provides a platform control system comprising: a central controller coupled with an encoder using a communication interface circuit and/or with a hardware micro-switch, wherein both the encoder and the hardware micro-switch cooperate with a stepper motor coupled with a power module which cooperates with the central controller, and wherein both the central controller and the power module are supplied from at least one power supply and cooled by a fan.

Preferably, the central controller is additionally coupled with a shutter socket and/or a USB port.

Preferably, the encoder is a mechanical-electrical assembly designed for converting and transmitting a signal indicating a current value of an angle α of a rotatable platform position.

Preferably, the micro-switch is an electrical-mechanical element designed for determining one constant value of an angle α position of a rotatable platform. Preferably, the at least one power supply is a 12V power supply.

The solution according to the invention further provides a system of spatial visualization of objects, in particular for a virtual fitting room, having a spatial pattern situated in front of a background, the background constituting a scene with at least one lamp illuminating the background and at least one lamp illuminating the spatial pattern in front of which an image or video capture device is situated, the system comprising: a rotatable platform whereon the spatial pattern is situated, the rotatable platform being connected to the image or video capture device, and the image or video capture device being connected to a processing device, wherein the processing device includes a processing module.

Preferably, the processing module comprises an input module, which cooperates with a comparator module, the comparator module cooperates with or without a coherence module, the coherence module cooperates with a combination creating module through a segmentation module.

Preferably, the image or video capture device is a camera or a video camera.

Preferably, the spatial pattern is in the form of a mannequin representing the full figure of a person.

The solution according to the invention further provides a computer-readable medium that stores a program executable by one or more processing devices to create a spatial visualization of objects, in particular for a virtual fitting room, wherein series of images are taken against a neutral background using an image or video capture device, comprising a first routine that takes a first series of images of a spatial pattern at a predetermined number of positions, the number of predetermined positions being determined on the basis of rotational movement of the spatial pattern situated on a rotatable platform around an axis of the rotatable platform by a predetermined angle α; a second routine that takes next series of images of the spatial pattern with at least one object superimposed onto the spatial pattern, next series of images being taken at a predetermined number of positions identical to the predetermined number of positions associated with the first series of images; a third routine that sends the first and the next series of images to a processing device; and a fourth routine that processes the first and next series of images to a full 360 degree view thereby enabling the combination of at least one object in different variants in the full 360 degree view on the spatial pattern.

The advantage of the solution according to the present invention is that it offers a high quality of presented objects and veristic mapping (i.e. accurate reproduction of the reality) of the presented objects. Furthermore, the solution according to the invention ensures extremely easy to operate technology for fast and smooth running of all applications in the conditions provided by a typical, average-quality Internet connection. Furthermore, the solution according to the invention can be offered for use in wide range of mobile devices, such as PDA devices, and can be easily integrated with every e-commerce platform.

BRIEF DESCRIPTION OF DRAWINGS

The subject matter of the invention is presented in the embodiment with reference to the enclosed figures wherein:

FIG. 2 shows a general flowchart of operations within the method of spatial visualization of presented objects, in particular for a virtual fitting room according to the invention;

FIG. 3 shows a block diagram of the electrical control system for the rotatable platform concerning the method and system of spatial visualization of presented objects, in particular for a virtual fitting room according to FIG. 1A-1D of the invention;

FIG. 4 shows schematically four examples (I, II, III, IV), each showing four exemplary positions of the contour of a spatial pattern without and with a superimposed object, in accordance with FIGS. 1A to 1D and FIG. 2 of the invention.

DETAILED DESCRIPTION OF THE INVENTION

The subject matter of the present invention is described in detail below with reference to the enclosed figures and embodiment. The present embodiment, however, serves only as an example and the present invention is not limited only to the embodiment presented herein.

Figure 1A:
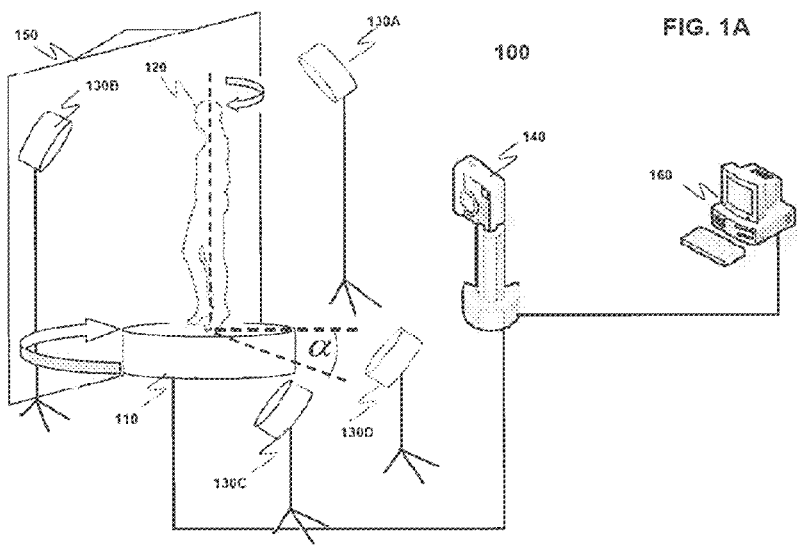
FIG. 1A-1D show a general diagram of connections between elements of the system of spatial visualization of presented objects, in particular for a virtual fitting room according to the invention.
Figure 1B:
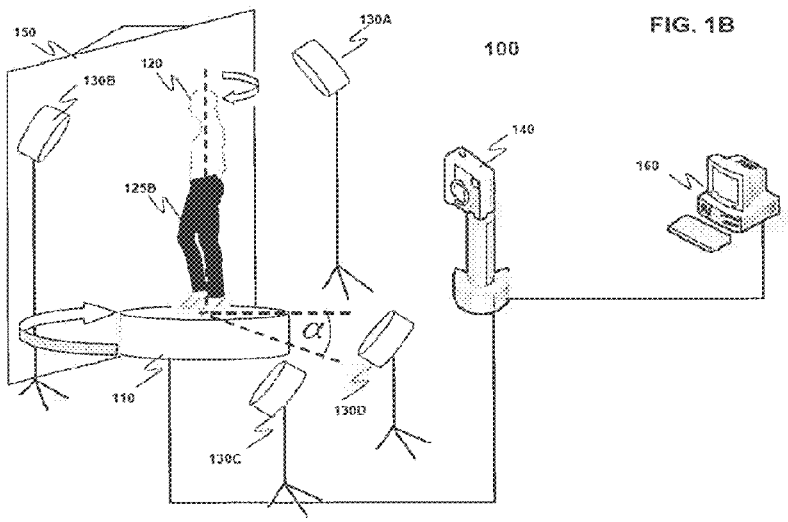
Figure 1C:
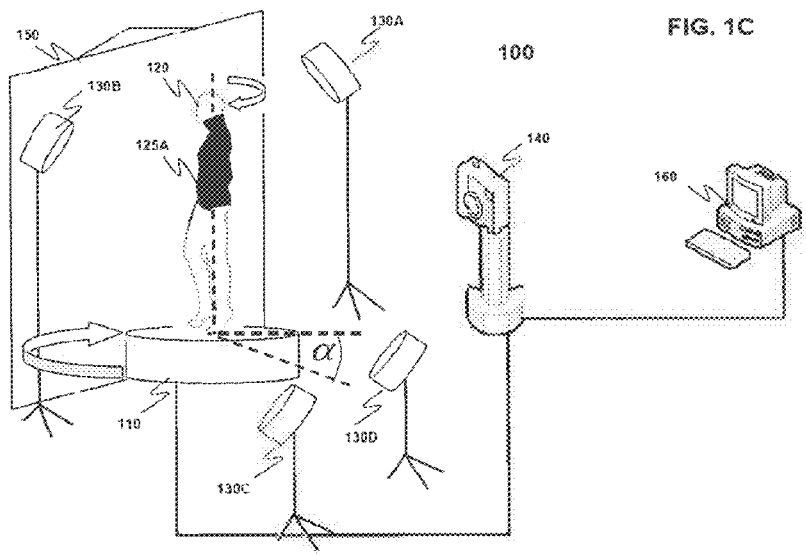
Figure 1D:
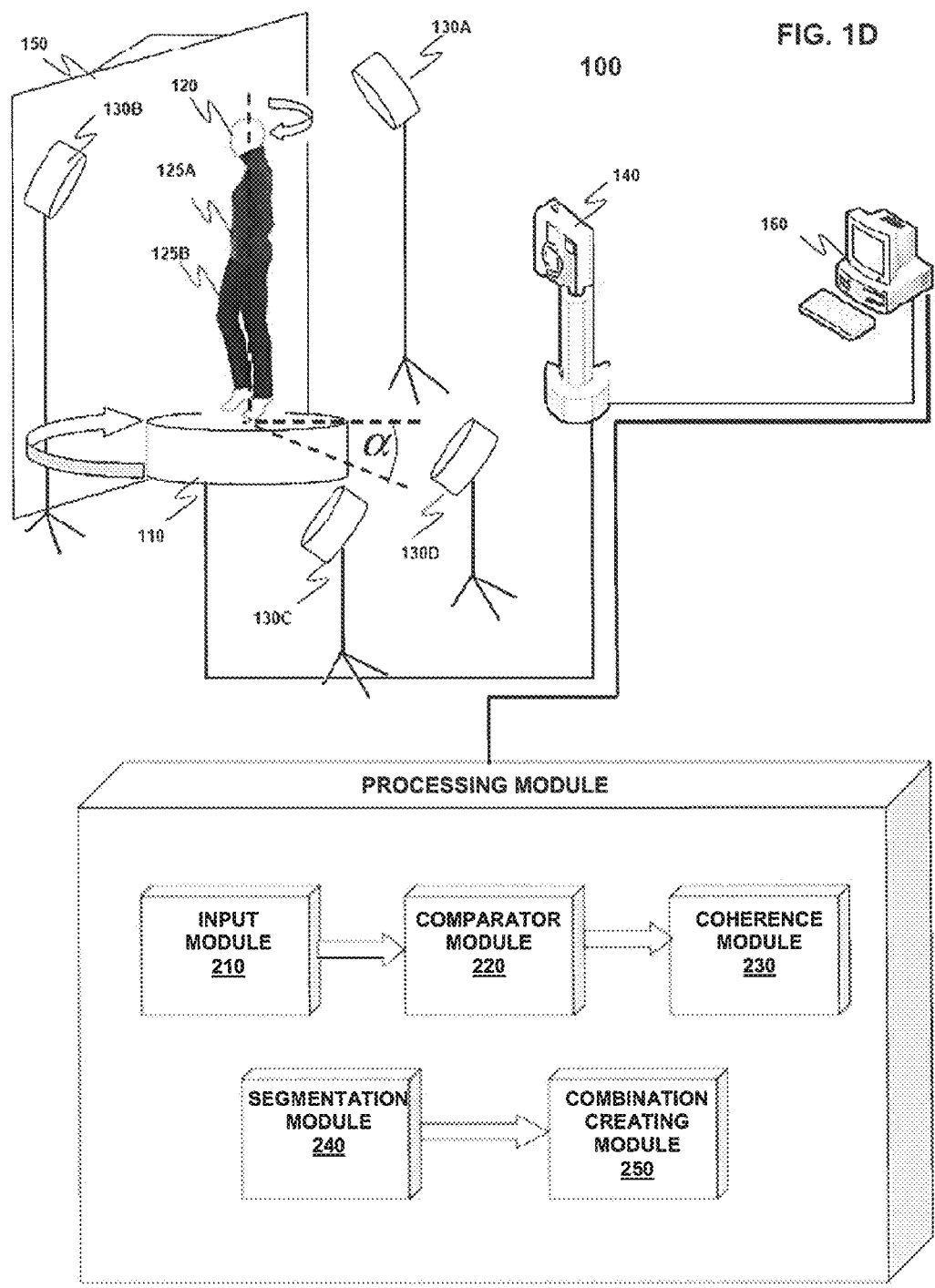

The embodiment illustrated in FIGS. 1A to 1D presents a general diagram of connections between elements of the system 100 of spatial visualization of presented objects, in particular for a virtual fitting room. The system 100 according to the present invention comprises a spatial pattern 120 in the form of a full-body mannequin in the present embodiment, which is situated in front of a background 150 on a suitably designed rotatable platform 110 controlled by means of a control system according to the invention (see FIG. 3). The said control system for controlling the platform 110 is connected to an image or video capture device 140 connected in turn to a processing device 160. The system is also provided with a lighting set which in the present embodiment comprises two main lighting lamps 130A, 130B directed towards the background 150 and two additional lighting lamps 130C, 130D directed towards the spatial pattern 120.

The above-mentioned platform control system presented in FIG. 3 was designed to enable rotation of the platform 110 within the range of the full 360° angle. Such design of the construction is intended to guarantee the possibility of taking series of images with a predetermined and constant photographic regime, which is discussed below.

In order to meet the demanded criteria, the platform control system 110 has been provided with a central controller 300 coupled with an encoder 380 by means of a communication interface circuit RS_422 350. The said encoder 380 is a mechanical-electrical assembly designed for converting and transmitting to the central controller 300 a signal indicating current value of angle α of the position of the rotatable platform 110. The communication interface circuit RS_422 350 is an element of the system between the encoder 380 and the central controller 300. The use of the encoder 380, which is situated in the feedback loop of the controller circuit, makes it possible to obtain the effect of precise positioning and control of the platform 110, which is so desirable when carrying out the present invention. The central controller 300 is further coupled with a hardware micro-switch 390 which is an electrical-mechanical element designed for determining one constant value of angle α position of the rotatable platform 110. Such solution makes it possible to call a function of returning the rotatable platform 110 from an arbitrary position to one specific position which is used as an initial position. In contrast to the encoder 380, which enables determining an arbitrary angle α position of the rotatable platform 110, the hardware micro-switch 390 enables only one, constant mechanical position, which is independent of the electronic system—the so called hardware position.

The use of both the encoder 380 and the hardware microswitch 390 in the platform control system 110 enhances functional and operational features of the platform. Both the encoder 380 and the hardware micro-switch 390 cooperate with a stepper motor 370, which, based on suitably synchronized pulse trains, performs the right or left rotation of the axis by moving at a predetermined rotation speed or remains in rest state with the effect of braking of the axis. The stepper motor 370 is coupled with the power module 340 which cooperates with the central controller 300. The central controller 300 and the power module 340 are powered from at least one 12V power supply 305A, 305B and are cooled by a fan 360.

As described above, the platform control system is provided with a central controller 300. The central controller 300 is coupled by means of a shutter socket 320 with a shutter release circuit of the above-mentioned image or video capture device 140 connected to a processing device 160, which performs predetermined functions in accordance with the user's commands. Furthermore, there has been provided communication between the processing device 160 and the rotatable platform 110 by means of serial interface USB port 310 which is provided in the platform control system. The operator's commands via central controller 300, after the impulses were shaped appropriately, control, in a strictly defined way, the input line of data in a digital controller of the stepper motor 370 with a transmission gear, and further via the transmission gear actuate a strictly defined rotational movement of the rotatable platform 110.

The above-mentioned image or video capture device 140 in the present embodiment is a camera mounted on a stationary tripod placed in front of a spatial pattern 120 and a background 150 so that a series of images can be obtained in the form of digital photographs. The said digital series of images is taken after stabilizing the position of the platform 110 and adjusting the shutter of the camera with a predetermined number of positions, e.g. 24 positions in the present embodiment (Position_1, Position_2, . . . , Position 24), which are determined on the basis of the rotational motion of the spatial pattern 120 situated on the platform 110 around its axis by a predetermined angle α, the value of which is 15 degrees in the present embodiment.

The above number of positions are schematically presented in four exemplary positions in FIG. 4 which shows a contour of a spatial pattern 120 with or without a superimposed at least one object 125A, 125B. Row I shows a contour of the spatial pattern 120 without a superimposed object 125A, 125B in four exemplary positions (Position_1, Position_2, Position_3 and Position_4). Row II shows the same contour of the spatial pattern 120 in the same positions as in Row I, but with an object 124B superimposed on the spatial pattern. Likewise, Row III shows the same contour of the spatial pattern 120 in the same positions as in Row I, with the second object 125A superimposed onto it. Finally, Row IV shows the same contour of the spatial pattern 120 in the same positions as in Row I, with superimposed objects 125A, 125B shown in Rows II and III, respectively.

Thus, we obtain a series of images of objects 125A, 125B placed on the spatial pattern 120 situated on the rotatable platform 110. The parameters relating to the movement of the rotatable platform 110 and control of the shutter of the image or video capture device 140 are configured in the processing device 160. Moreover each series of images in the form of digital photographs is further transmitted to the said processing device 160 which is connected to a camera. Then, the processing device 160, using the processing module 200 of the present invention, implemented in its structure, performs a series of the operations of processing the series of images, as shown in FIG. 2.

The above-mentioned processing module 200 comprises an input module 210 which cooperates with a comparator module 220 which in turn cooperates with a coherence module 230 which cooperates with combination creating module 250 via a segmentation module 240. According to the embodiment presented in FIG. 2 of the invention, the input module 210 performs a process 210A consisting in initial processing of a series of images wherein a contour of a spatial pattern 120 with or without a superimposed object 125A, 125B is extracted from the background 150. The process 210A is characterized in that that a darker, centrally situated spot is against a white background 150, which spot corresponds to the spatial pattern 120 with superimposed at least one object 125A, 125B, such as a blouse, trousers or other garments or accessories. It is important that, due to selection of main lighting lamps 130A, 130B and additional lighting lamps 130C, 130D and of the above-described photographic parameters it is possible to obtain this effect even in the case of a white spatial pattern 120 with superimposed white objects 125A, 125B. The histogram of such a series of images is characterized by two clearly exposed peaks—one corresponding to the background 150 and the other one corresponding to the spatial pattern 120 with at least one superimposed object 125A, 125B. Between those peaks, there is a brightness threshold value that separates the background 150 from the object 125A, 125B. Then, starting from the left upper corner, we begin to search spirally the image in order to find a point on the contour of the spatial pattern 120 with superimposed at least one object 125A, 125B. Such two neighboring points in one line of the image are characterized in that they have such brightness values that the left point has a brightness below the threshold value and the right point has a brightness above the threshold value. Having obtained the first point of the contour of the spatial pattern 120 we proceed in the anticlockwise direction to find next points of the contour of the spatial pattern 120 with superimposed at least one object 125A, 125B. This convergence is guaranteed by appropriate photographic regimes as described in detail above, such as the position of the spatial pattern 120, image or video capture device 140, background 150 and lighting set comprising lighting lamps 130A, 130B, 130C, 130D.

Subsequently, such an initially processed series of images is subjected to further processing in the process 220A by means of the comparator module 220 cooperating with the input module 210. Namely, in the process 220A, the obtained contour of the spatial pattern 120 with superimposed object 125A, 125B is compared with the contour of the spatial pattern 120 without a superimposed at least one object 125A, 125B i.e. the so called reference pattern contour of the spatial pattern 120.

Despite the fact that the photographic regime, described in detail above, is strictly followed and the procedure is carried out with maximum care and in a repeatable manner, there are always some deviations when the series of images are taken.

Therefore, a process 230A of matching the obtained images of objects 125A and/or 125B with the contour of the spatial pattern 120 is carried out by means of the coherence module 230. The process 230A consists in that an image in the form of a contour of a spatial pattern 120 with a superimposed at least one object 125A, 125B and an image in the form of a contour of a spatial model pattern 120 without a superimposed at least one object 125A, 125B are processed so that the object 124A, 125B placed on the contour of the spatial model pattern 120 fits as accurately as possible the contour of the spatial pattern 120 without the superimposed at least one object 125A, 125B. The processing consists in adjusting the shape and colour of the image in the form of images without changing their overall appearance. This comparison consists in counting pixels within the area being the difference of areas between the area of the first object and the area of the second object when the first object is superimposed on the second object and subsequently multiplying the resultant number by the number of pixels within the area being the difference of areas between the area of the second object and the area of the first object when the second object is superimposed on the first object. Matching consists in determining such affine transformation i.e. including rotation, shift and scaling, which will minimize the values of a function defined in this way. Since the above-described function is not a function of a specific set of parameters, its minimum may be found by the Powell method as described in "Powell M J D (1964) *An efficient method for finding the minimum of a several variables without calculating derivatives*", Computer Journal, Chapter 7, pages 155-162.

Such calibrated series of images are subjected to the process 240A of segmentation of image series carried out by means of the segmentation module 240 in order to find a spot of colours which correspond to garments in the present embodiment—objects 125A, 125B. For this purpose, an algorithm of selective image segmentation is used—a space of colours of the photo is processed to L*ab colour system. Different parts of an image are assigned to specific numerical signature obtained by means of an iteration mechanism designed for finding the dominant signatures responsible for uniform portions of an image (materials may have complicated textures and various patterns, etc.). Subsequently, dominant parts of an image are found by means of analysis of the signature space.

Series of images obtained in this way make it possible to combine objects 125A, 125B which were not photographed together in a real situation. This operation is performed in the combination creating module 250 wherein the process (250A) of bonding respective series of images in the form of photographs is carried out, (i.e. i-th photograph of the first series of images with i-th photograph of the second series of images). The bonding process consists in determining the value assigned to a pixel at point (x,y) in the created photograph. To this end, pixel (x, y) in i-th photograph of the first series of images is compared with pixel (x,y) in i-th photograph of the second series of images, taking into account that both series of images consist of photographs of the same size in pixels. Additionally, to each element in the form of objects 125A, 125B there is assigned a number which indicates a clothing layer to which a specific garment belongs. For example, the number assigned to a piece of underwear is lower than the number assigned to a pair of trousers or a skirt, etc. Assuming at the same time that the first series of images has a layer number higher than the second series of images. In this case there are two possible situations—pixel (x,y) of i-th photograph of the first series of images belongs to either an object 125A, 125B or to the background 150. If pixel (x,y) of i-th photograph of the first series of images belongs to the object 125A, 125B, then, in the resultant photograph, the value of pixel (x,y) in i-th photograph is the same as for pixel in i-th photograph of the first series of images. When pixel (x,y) belongs to the background 150 of i-th photograph of the first series of images, the value of pixel (x,y) of i-th photograph of the resultant series of images is the same as the value of pixel (x,y) of i-th photograph of the second series of images.

The claimed invention makes it possible to create a 360° view from a series of images obtained in the above-described way, using the above-described technical means; the resultant 360° view is a very close approximation of a view that could be obtained by taking a series of images of a spatial model pattern 120 with superimposed objects 125A, 125B i.e. of a spatial model pattern 120 dressed in a specific set of garments, accessories, shoes, etc. A 360° view obtained by the claimed method is presented to a user by means of the Internet in order to show him/her the result of his/her choice of individual combinations of garments, accessories, shoes, etc, as described in the present embodiment.

The above description of the presented embodiment of the invention has been provided to enable a person skilled in the art to carry out or use the invention. The present embodiment may be modified to include all such changes, modifications and variants that fall within the scope of the essence of the invention and the enclosed patent claims. The basic rules defined herein may be applied in other embodiments without going beyond the scope of the invention. Thus, the present invention is not intended to limit it to the presented embodiment but to provide it with the widest possible scope consistent with the principles and new features presented herein.

The present invention, using technical means as shown in FIGS. 1A-1D and FIG. 3 and combining them in a specific, suitable way, offers a simple and efficient tool for a virtual fitting room which enables the Internet user to create combinations of garments and accessories on a spatial pattern in the form of a mannequin and watch it in a 360° view via the Internet.

The invention may be widely used to offer services, especially for companies within a wide range of clothing industry, including in particular the fashion business, providing them with a technology that ensures a high quality garments presented in a virtual environment in the form of a veristic mapping of the presented objects.

The invention claimed is:

1. A method of spatial visualization of objects, in particular for a virtual fitting room, wherein series of images of the objects are taken against a neutral background by means of an image or video capture device, comprising the steps of:

taking a first series of images of a spatial pattern at a predetermined number of positions, the number of predetermined positions being determined on the basis of a rotational movement of the spatial pattern situated on a rotatable platform around an axis of the rotatable platform by a predetermined angle α;

subsequently taking a next series of images of the spatial pattern with at least one object superimposed onto the spatial pattern, the next series of images being taken at a predetermined number of positions identical to the predetermined number of positions associated with the first series of images;

sending the first and the next series of images to a processing device; and processing the first and next series of images in the processing device using a processing module in order to process the first and next series of images to a full 360 degree view thereby enabling the combination of at least one object in different variants in the full 360 degree view on the spatial pattern.

2. The method of claim 1, wherein the first and next series of images is taken in the form of a series of photographs, and wherein each photograph in the series of photographs is taken after each rotation of the spatial pattern around the axis of the rotatable platform by a predetermined angle α of 15 degrees.

3. The method of claim 1, further comprising the steps of:
extracting from the neutral background a contour of the spatial pattern with or without at least one object superimposed onto the spatial pattern using an input module of the processing module, wherein the input module is coupled with a comparator module;
comparing the contour of the spatial pattern with or without at least one object superimposed onto the spatial pattern using the comparator module;
segmenting each of the series of images using a segmentation module; and
bonding the images using a combination creating module in order to obtain the full 360 degree view.

4. The method of claim 1, further comprising the step of matching objects with a contour of the spatial pattern using a coherence module.

5. The method of claim 3, further comprising the step of matching objects with the contour of the spatial pattern using a coherence module.

6. A computer-readable medium that stores a program executable by one or more processing devices to create a spatial visualization of objects, in particular for a virtual fitting room, wherein series of images are taken against a neutral background using an image or video capture device, comprising a first routine that takes a first series of images of a spatial pattern at a predetermined number of positions, the number of predetermined positions being determined on the basis of rotational movement of the spatial pattern situated on a rotatable platform around an axis of the rotatable platform by a predetermined angle α;

a second routine that takes next series of images of the spatial pattern with at least one object superimposed onto the spatial pattern, next series of images being taken at a predetermined number of positions identical to the predetermined number of positions associated with the first series of images;

a third routine that sends the first and the next series of images to a processing device; and a fourth routine that processes the first and next series of images to a full 360 degree view thereby enabling the combination of at least one object in different variants in the full 360 degree view on the spatial pattern.

* * * * *